United States Patent

[11] 3,540,693

| [72] | Inventor | Eugene H. Wise |
| | | Saugus, California |
| [21] | Appl. No. | 751,610 |
| [22] | Filed | Aug. 9, 1968 |
| [45] | Patented | Nov. 17, 1970 |
| [73] | Assignee | R. & G. Sloane Manufacturing Company |
| | | Inc., a corporation of Delaware |

[54] BALL VALVE
12 Claims, 4 Drawing Figs.

[52] U.S. Cl.................................................. 251/151,
251/170, 251/315
[51] Int. Cl. ................................................. F16k 5/20
[50] Field of Search............................................ 251/315,
317, 172, 175, 148, 151, 170

[56] References Cited
UNITED STATES PATENTS

| 3,056,577 | 10/1962 | Kulisek........................ | 251/315 |
| 3,244,398 | 4/1966 | Scaramucci.................. | 251/148 |
| 3,367,359 | 2/1968 | Johnson ...................... | 251/172X |
| 3,367,624 | 2/1968 | Scaramucci.................. | 251/148 |
| 3,373,967 | 3/1968 | Scaramucci.................. | 251/148 |
| 3,373,968 | 3/1968 | Scaramucci.................. | 251/315X |
| 3,390,861 | 7/1968 | Masheder..................... | 251/315X |
| 3,401,914 | 9/1968 | Shand.......................... | 251/315X |

FOREIGN PATENTS

| 234,746 | 7/1961 | Australia..................... | 251/315 |
| 988,283 | 9/1965 | France ........................ | 251/172 |

Primary Examiner—M. Cary Nelson
Assistant Examiner—Michael O. Sturm
Attorney—Martha L. Ross ABSTRACT: A random-entry cartridge type ball valve assembly including a pair of flanged connecting members, and a tubular valve body positioned between the flanged members and secured thereto by a plurality of nut and bolt connections. A valve ball member is rotatably mounted within the valve body and a plurality of annular sealing assemblies are provided within the valve body between the ball member and the flanged connecting members. Each of the sealing assemblies comprises an outer annular retainer and an inner annular seal in engagement with the ball member. A recess is provided between the valve body and each of the connecting members for the purpose of enabling the flanges on the connecting members to be placed under compression by the nut and bolt assemblies to thereby compress the annular seals between the ball member and the flanges to provide an adequate seal between the ball member and the connecting members.

Patented Nov. 17, 1970
3,540,693
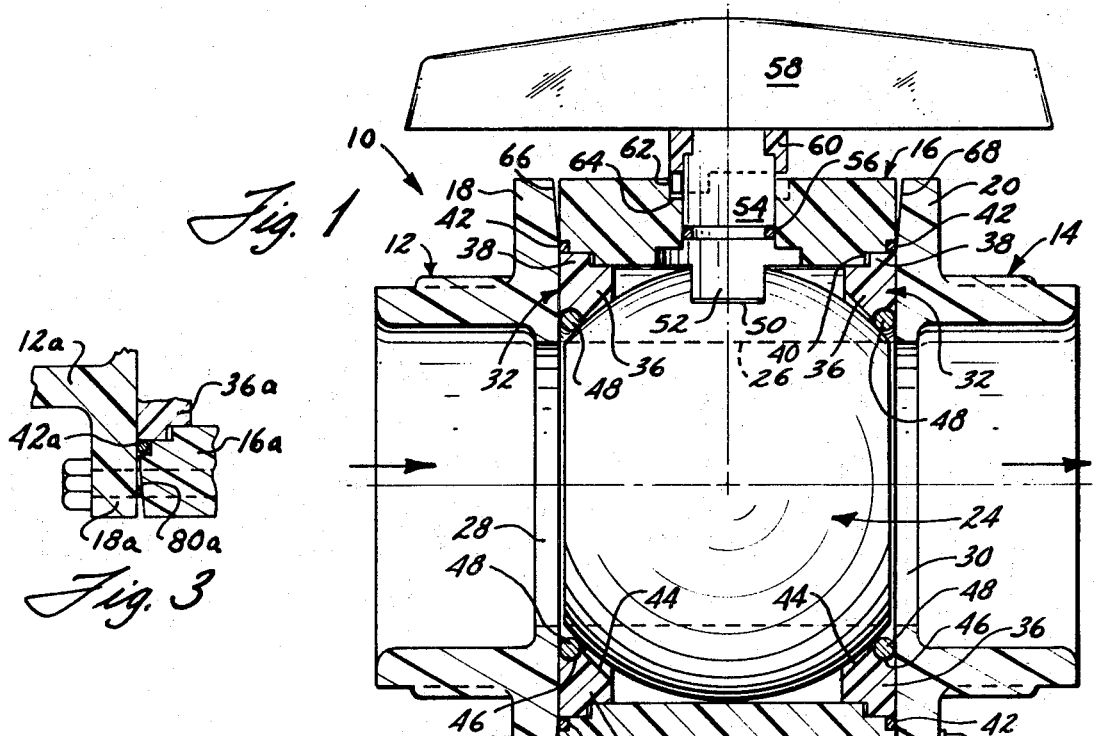
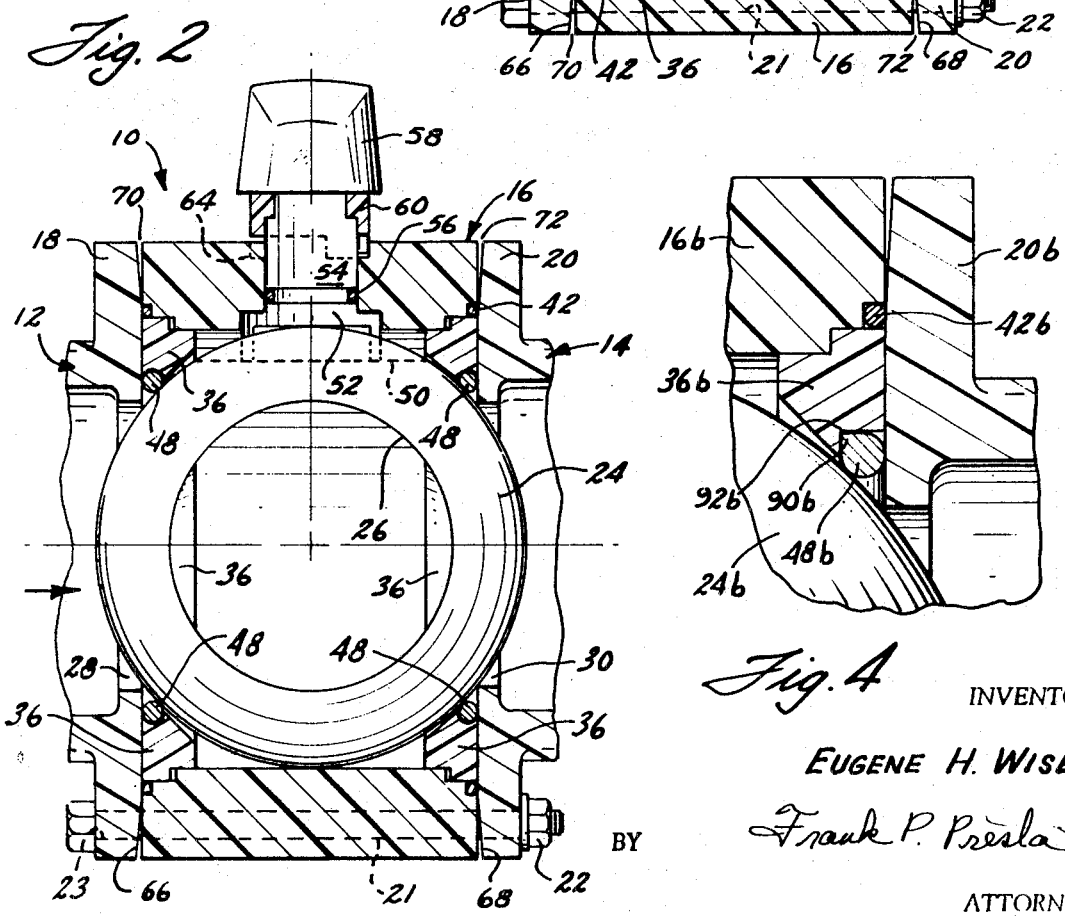
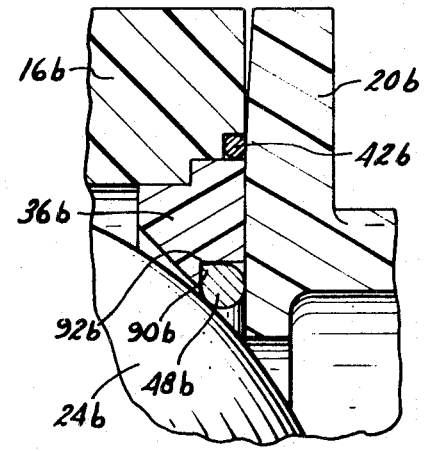
INVENTOR
EUGENE H. WISE
Frank P. Presta
BY
ATTORNEY

BALL VALVE

BACKGROUND AND SUMMARY OF THE INVENTION

This invention relates generally to a new and improved ball valve and, more particularly, to a random-entry, cartridge type ball valve.

Heretofore, various valves of the so-called top-entry and end-entry types have been utilized, but many have been subject to one or more of the following disadvantages:
1. Top-entry ball valves presently being used are limited either to smaller sizes or low pressure use, owing to the overly large body size of the valve.
2. In most cases, end-entry ball valves, when used in a solvent welded plastic piping system, must be severed from the system for repair or replacement, and in so doing, some parts are destroyed.
3. Practically all ball valves must be hand or wrench tightened from time to time to compensate for wear and extreme temperature conditions to prevent leakage.
4. Many ball valves are complicated in construction and thus are expensive to manufacture.
5. The vast majority of ball valves have special or custom seals of various types that are not readily available from local sources.
6. Many existing ball valves are of a construction or configuration that is not compatible to conventional plumbing and piping systems.

The ball valve of the present invention is not subject to any of the aforementioned disadvantages and, additionally, incorporates other advantages not present in prior art ball valves.

It is, accordingly, an object of the present invention to provide a random-entry ball valve which is simple in construction and reliable in operation.

An additional object is to provide a ball valve wherein a tight sealing pressure is constantly maintained between the seals and the valve ball even after a substantial period of use and wear of the seals has taken place, without requiring external or internal hand take up or adjustment for the life of the valve assembly.

Another object is the provision of a ball valve which may be easily disassembled for repair without the necessity of removing the flanged connector members attached to the valve body from the pipeline in which the valve is installed, or without the necessity of cutting the pipeline.

A further object is to provide such a ball valve wherein the valve ball member, the ball seals, and seal retainers are radially movable to a slight degree or are "floating" within the valve body to provide the feature of self-alignment.

A still further object is to provide a ball valve in which the ball member is free to move axially within the valve body in the shutoff position, should clearance develop between the ball member and the seals, thereby to permit the ball member to shift downstream and exert additional pressure against the downstream seals when the valve is closed.

Another object is to provide a valve in which the valve body or center section assembly may be indexed around the mounting holes in the connector member flanges to provide any positioning of the valve handle one might desire.

Still another object is the provision of such a ball valve wherein conventional O-rings may be utilized as the seals for the valve ball member.

An additional object is to provide a valve that has a replaceable center section assembly in the form of a cartridge or unitary package, thus providing a valve of unlimited life.

Numerous other objects and advantages of the present invention will be apparent as it is better understood from the following description, which, taken in connection with the accompanying drawings, discloses a preferred embodiment thereof.

The above objects are accomplished by providing a random-entry ball valve comprising a pair of flanged connecting members and a tubular valve body disposed therebetween and connected thereto by a plurality of nut and bolt connections. A valve ball member is rotatably mounted within the valve body and is supported therein by a pair of annular sealing assemblies disposed between the ball member and the flanged connecting members secured to the valve body. Because the sealing assemblies are movable relative to the valve body and the ball member is slidably connected to a stem which extends through the valve body and is attached to an operating handle, the ball member is self-aligning within the valve body and is shiftable slightly in a downstream direction when it is rotated to a closed position, thereby exerting firm sealing pressure against the downstream sealing assembly.

A clearance is provided between the valve body and each of the flanges of the end connecting members for the purpose of enabling the flanges to be placed in compression by the nut and bolt assemblies securing the flanges to the valve body to thereby exert a firm compressive force upon the sealing assemblies to produce adequate sealing engagement between the sealing assemblies and the valve ball member. This tight sealing pressure provides an adequate seal for the ball member and compensates for any normal wearing of the seals after extended use of the valve. The clearance between the valve body and the flanges of the end connecting members may be provided by tapering the inner faces of the flanges or by tapering the outer faces of the valve body.

Referring to the drawings:

FIG. 1 is an elevational view, partly in section, of a ball valve constructed according to the principles of the present invention, showing the valve ball member in an open position;

FIG. 2 is an elevational view similar to FIG. 1, showing the valve ball member in a closed position;

FIG. 3 is an elevational view in section of a portion of an end member flange and the valve body, showing a modified form of the invention; and FIG. 4 is an enlarged partial elevational view in section, showing a modified seal and retainer assembly.

DESCRIPTION OF THE PREFERRED EMBODIMENT

As a preferred or exemplary embodiment of the present invention, FIG. 1 illustrates a random-entry ball valve 10 generally comprising a pair of end-connecting members 12, 14 and a tubular valve body 16 disposed between the end members. The end members 12 and 14 have annular flanges 18 and 20, respectively, that are disposed adjacent the valve body 16 and secured thereto by a plurality of nut and bolt connections 22. The nut and bolt connections 22 extend through complementary bores 21, 23 in the valve body 16 and the end member flanges 18 and 20, and are circumferentially spaced about the peripheral portions of the flanges 18 and 20 in any suitable or desirable manner. The end members 12 and 14 may be constructed in any suitable manner to enable them to be connected in any desired manner to adjacent portions of a pipeline (not shown).

A valve ball member 24 is disposed within the valve body 16 between the end members 12 and 14, and comprises a bore 26 extending therethrough which is substantially the same diameter as, and adapted to be aligned with circular openings 28 and 30 in the end members 12 and 14, respectively. The ball member 24 is rotatable within the valve body 16 between the open position shown in FIG. 1 and the closed position shown in FIG. 2, and is supported within the valve body by a pair of sealing assemblies 32 disposed between the ball member 24 and the valve body 16 and end member flanges 18 and 20.

Each of the sealing assemblies 32 comprises an annular seal retainer 36 having an outwardly extending portion 38 that is disposed within an annular recess 40 on the interior surface of the valve body 16. The recesses 40 in the valve body 16 are slightly larger than the outwardly extending portions 38 on the seal retainers 36 for the purpose of enabling the retainers 36 to shift relative to the valve body 16 and the end members 12 and 14, the purpose of which will be described more fully hereinafter. Each of the recesses 40 in the valve body 16 are provided with smaller outwardly extending recessed portions in which an O-ring 42 is disposed to provide a seal between the valve body and the adjacent end member 12 or 14.

The inner portion of each of the seal retainers 36 is provided with a tapered inner surface 44 that merges with a curved surface 46 in which an O-ring seal 48 is mounted. The O-ring seals 48 extend inwardly beyond the retainers 36 into engagement with the exterior surface of the valve ball member 24. The seals 48 are compressed or wedged between the ball member 24 and the adjacent portion of the end members 12 and 14 to provide a fluid-tight seal therebetween.

The valve ball member 24 is provided with a recess 50 in the upper portion thereof in which the lower end 52 of a stem member 54 is slidably disposed. The stem member 54 may be of any suitable or conventional construction and preferably comprises an annular recess in which an O-ring 56 is disposed to provide a seal between the stem member and the adjacent surface of the valve body 16 defining a bore in which the stem member is rotatably mounted. A handle member 58 is secured to stem member 54 in any suitable or conventional manner and comprises a downwardly extending portion 60 surrounding the stem member 54 and having a depending lug 62 that is disposed within an annular recess 64 in the valve body 16 for the purpose of limiting rotational movement of the stem member 54 and thus the valve ball member 24. The valve body recess 64 is provided with stops (not shown) for limiting the angular movement of the lug 62, and thus that of the stem and ball members 54 and 24, respectively, to an angle of 90° between the open position of FIG. 1 and the closed position of FIG. 2.

End member flanges 18 and 20 are provided with inner annular tapered portions 66 and 68, respectively, which are tapered outwardly away from the adjacent portions of the valve body 16 to provide annular recesses 70 and 72 therebetween. Preferably, the tapered portions 66 and 68 of the flanges 18 and 20, respectively, extend inwardly at least to the O-rings 42 for the purpose of enabling the flanges 18 and 20 to be stressed when the nut and bolt assemblies 22 are tightened to thereby place a compressive force on the seals 48 to provide a fluid-tight seal between the ball member 24 and the end members 12 and 14. This compressive force on the seals 48 automatically compensates for any wear in the seals 48 after extended use of the valve 10, thereby insuring that the seals 48 will always be maintained in tight sealing relationship with the ball member 24, without the necessity of adjustment.

From the foregoing description, it will be readily seen that the ball member 24 is supported within the valve body 16 by the sealing assemblies 32 and, more particularly, by the seals 48. Since the seal retainers 36 are slightly movable within the valve body recesses 40 and the valve ball 24 is slidably movable relative to the lower portion 52 of the stem member 54, it will be appreciated that the ball member 24 is "floatingly" supported within the valve body 16 and is movable relative to the valve body 16 and end member flanges 12 and 14. When in the closed position shown in FIG. 2, the upstream line pressure within end member 12 will shift the ball member 24 in a downstream direction (to the right as shown in FIG. 2) into even tighter sealing engagement with the downstream seal 48 to further promote a fluid-tight seal at the downstream end of the valve and to effectively prevent any leakage to the end member 14 when the valve is closed. The clearance between the valve body 16 and the sealing assemblies 32 permits these sealing assemblies to locate themselves accurately on the surfaces of the valve ball member 24 to maintain uniform fit and pressure over the entire circumference of the line of contact between the ball member and the O-ring seals 48, thus eliminating the necessity for extreme accuracy in manufacture of these valve components.

The bores 21 and 23 through the valve body 16 and the annular end member flanges 18 and 20, respectively, preferably are evenly spaced around the circumference of these members. This feature allows for an angular change in position of the valve handle 58 and stem 54 with respect to the end members 12, 14 and the pipeline connected thereto.

FIG. 3 discloses a modified form of the instant valve wherein a tapered annular portion 80a is provided on each side of the valve body 16a, rather than on the end member flanges 18a and 20a to provide recesses therebetween and to enable the flanges to be stressed in a manner to apply a tight compressive force on the ball member seals, as hereinbefore described. In this modification, the tapered portions 80a on the valve body 16a preferably extend inwardly to the recesses in which the O-rings 42a are disposed.

FIG. 4 discloses a second modified embodiment of the instant valve wherein the O-ring seals 48b are provided with a sharp-edged annular portion 90b rather than being completely circular in cross section. Each seal portion 90b is supported within a complementary annular surface 92b on the inner portion of the adjacent seal retainer 36b. This embodiment of the invention is advantageous in that it is extremely difficult to form O-ring seals that are completely circular in cross section in various sizes for different sized valves. It is simpler and more economical to form the seals for such valves with sharp-edged portions such as portion 90b as shown in FIG. 4.

It will be readily seen from the foregoing description that the valve of the instant invention provides a firm sealing pressure between the seals and the valve ball member, even after some wear of the seals has occurred owing to extensive use of the valve. In addition, the ball member is "floatingly" supported by the seals within the valve body and thus is capable of self-alignment therein to insure adequate sealing when the valve is in an open or a closed position. The components of the subject valve may be formed of any suitable material without departing from the scope of the instant invention and, as an illustrative example, the seals may be formed of a material such as Teflon, and the other valve components may be formed of a plastic material such as polyvinyl chloride.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:
1. A valve, comprising:
 a valve body having open ends to enable flow therethrough;
 a pair of end members adapted to be secured to the ends of said valve body, each end member having a flow passageway therethrough positioned to communicate with the adjacent end of said valve body when said end member is secured thereto;
 a valve member disposed in said valve body and being movable between an open position wherein flow is permitted through said valve body;
 a pair of annular resilient seals disposed in said valve body, one of said seals being positioned between and in engagement with said valve member and one of said end members, and the other of said seals being positioned between and in engagement with said valve member and the other of said end members;
 means for nonabuttably securing said end members at the ends of said valve body and providing a compressive force continually to said seals by said end members; and
 said nonabutting valve body and end members structurally defining annular recesses therebetween when secured together by said securing means to enable said compressive force to be continuously applied to said seals by said end members, to initially compress said seals into a sealing relationship with said valve member and thereafter maintain said sealing relationship by automatically compensating for seal wear as said seal becomes worn during use.

2. The valve of claim 1 wherein each of said annular recesses is defined by an annular tapered portion on the face of an end member adjacent an end face of said valve body.

3. The valve of claim 2 wherein said tapered portion extends inwardly beyond the adjacent end face of said valve body.

4. The valve of claim 1 wherein each of said annular recesses is defined by an annular tapered portion on an end face of said valve body adjacent the face of an end member.

5. The valve of claim 1 wherein a pair of annular seal retainers is disposed in said valve body in surrounding and supporting relation to said seals, said retainers being movable relative to said valve body.

6. The valve of claim 5 wherein a stem member is movably mounted on said valve body, and said valve member is movably connected to said stem member.

7. The valve of claim 6 wherein said seal retainers are slidably mounted on said valve body for axial movement relative thereto, and said valve member is slidably connected to said stem member for axial movement relative to said valve body when said valve member is in said closed position.

8. The valve of claim 5 wherein each seal has a sharp-edged outer annular portion, and each retainer has a sharp-edged inner surface portion complementary to and supporting said seal portion.

9. A valve, comprising:

a valve body having a cylindrical flow passageway and open ends;

a pair of end members, each comprising an annular flange disposed adjacent a valve body end and a flow passageway therethrough in communication with said valve body passageway;

a valve ball member disposed in said valve body and being rotatable between an open position wherein flow is permitted through said valve body passageway and a closed position wherein flow is prevented through said valve body passageway;

a pair of annular sealing assemblies disposed in said valve body, one of said sealing assemblies being positioned between and in engagement with said ball member and one of said end members, and the other of said sealing assemblies being positioned between and in engagement with said ball member and the other of said end members;

means for nonabuttably securing said end member flanges at the ends of said valve body and applying a compressive force continuously to said seals through said end member flanges; and said nonabutting valve body and end member flanges structurally defining annular recesses therebetween when secured together by said securing means to enable the compressive force applied on said end member flanges by said securing means to compress said sealing assemblies between said ball member and said end members continuously during operation of said valve thereby to compensate automatically for seal wear.

10. The valve of claim 9 wherein each of said annular recesses is defined by an annular tapered portion on the face of an end member flange adjacent an end face of said valve body, said tapered portion extending inwardly beyond the adjacent end face of said valve body.

11. The valve of claim 9 wherein each of said annular recesses is defined by an annular tapered portion on an end face of said valve body adjacent to the face of an end member flange.

12. The valve of claim 9 wherein said valve body and said end member flanges are provided with a plurality of complementary apertures therethrough, and said securing means comprises a plurality of nut and bolt connections extending through said apertures.

UNITED STATES PATENT OFFICE
CERTIFICATE OF CORRECTION

Patent No. 3,540,693      Dated November 17, 1970

Inventor(s) Eugene H. Wise

It is certified that error appears in the above-identified patent and that said Letters Patent are hereby corrected as shown below:

1. Claim 1, Column 4, Line 51: Insert --and a closed position wherein flow is prevented through said valve body-- after "body;".

2. Claim 2, Column 4, Line 72: Insert --to-- after "adjacent".

3. Claim 4, Column 5, Line 3: Insert --to-- after "adjacent".

4. Claim 9, Column 6, Line 8: Delete "seals" and insert --sealing assemblies--.

5. Claim 10, Column 6, Line 20: Insert --to-- after "adjacent".

SIGNED AND
SEALED
MAR 16 1971

(SEAL)
Attest:

Edward M. Fletcher, Jr.
Attesting Officer

WILLIAM E. SCHUYLER, J
Commissioner of Patent